United States Patent [19]

Ljungberg et al.

[11] 4,217,085

[45] Aug. 12, 1980

[54] ARRANGEMENT FOR THE PROCESSING OF A MOVING MATERIAL WEB

[75] Inventors: Per-Allan Ljungberg; Lennart Nilsson, both of Lund, Sweden

[73] Assignee: Tetra Pak International AB, Lund, Sweden

[21] Appl. No.: 31,331

[22] Filed: Apr. 18, 1979

[30] Foreign Application Priority Data

Apr. 25, 1978 [SE] Sweden ................................ 7804705

[51] Int. Cl.$^2$ ................................................ B29C 17/08

[52] U.S. Cl. ........................................ 425/335; 83/306; 83/480; 93/58.2 R; 226/108; 226/181; 425/291; 425/385

[58] Field of Search ............... 425/168, 136, 145, 291, 425/436 RM, 335, 337, 385, 363; 264/DIG. 73, DIG. 28; 226/108, 181, 188; 83/306, 480; 93/58 R, 58.1, 58 P, 58.2 R, 58.4

[56] References Cited

U.S. PATENT DOCUMENTS

| | | | |
|---|---|---|---|
| 2,276,394 | 3/1942 | Hill et al. | 264/DIG. 28 |
| 2,985,223 | 5/1961 | Thorn | 93/58.2 R |
| 3,174,428 | 3/1965 | Huck | 226/188 |

*Primary Examiner*—James B. Lowe
*Attorney, Agent, or Firm*—Burns, Doane, Swecker & Mathis

[57] ABSTRACT

An arrangement for the processing of a moving material web, in particular for the creasing or punching of an extruded material web made of plastics. In the manufacture of such material webs a number of operational steps take place directly in conjunction with the manufacture of the web itself, and the fact that for reasons of quality as well as of manufacturing technique the extrusion process cannot be interrupted makes it necessary to attend to any changes in the crease pattern etc. during operation. The arrangement in accordance with the invention makes this possible, in that the material web can be brought into contact optionally with different pairs of processing rollers with the help of a pair of counter-rollers supported in a swivelling cradle, any pair of unused rollers being freely exchangeable against a pair of rollers with a different creasing pattern. The arrangement permits the processing of both sides of the web and the rapid exchange of different processing patterns during continuing production, which is particularly advantageous in the processing of material webs for the manufacture of packing containers.

10 Claims, 3 Drawing Figures

ARRANGEMENT FOR THE PROCESSING OF A MOVING MATERIAL WEB

The present invention relates to an arrangement for the processing of a moving material web. Material webs of various types are used in the packaging industry for the manufacture of packing containers, e.g. for different types of semiliquid or liquid foods. In the manufacture of packing containers, e.g. for milk and cream up to now mainly a material web was used which comprised a central carrier layer of a fibrous material, e.g. paper, which is coated on both sides with a material impervious to liquid, usually a thermoplastic material. In the manufacture of the material, the carrier layer is imprinted first with the desired decoration and text, whereupon the printed material is fed through a coating machine wherein the carrier layer is coated with the two thermoplastic layers. Subsequently the packing material web is usually fed through a creasing machine, wherein with the help of rollers with creasing rules and counter-rollers it is provided with a desired pattern of crease-lines, which facilitate the subsequent conversion of the packing material web to individual packing containers. In the creasing machine it is possible to carry out other processing operations, e.g. the punching of pouring holes or of tearing directions. After a further operational step in the form of side-cutting or cutting to a suitable width, the finished packing material web is wrapped up to form rolls, which are adapted to the type of packing machine wherein the packing material web is intended to be used.

Beside the above-mentioned, well-known packing material web presently another type of laminated packing material is also used which is characterized especially in that it is wholly made of plastics. The central carrier layer, which has been described above as consisting of fibrous material, has been substituted in this type of packing material by a layer of foamed plastic material. This carrier layer is relatively thick and is covered on both sides by homogeneous plastic layers of e.g. a thermoplastic material. Owing to the relatively great distance between the said homogeneous plastic layers the material will be very rigid. The manufacture of this material takes place so that the carrier layer directly after extrusion is laminated with the two homogeneous plastic layers, whereupon the laminate is printed, provided with crease lines, cut to a suitable width and wrapped up to finished rolls in a format suitable for the packing machine.

The manufacture of the two abovementioned packing laminates thus occurs in principle in a similar manner. However, there is an important difference in that in the manufacture of the all-plastic laminate the extrusion cannot be interrupted or the rate of extrusion be reduced whilst the process continues. The manufacture of paper/plastics laminate on the other hand can be temporarily interrupted with the web still in position through the different processing stations, since the carrier layer is supplied off a roll. If interruption becomes necessary in the manufacture of all-plastic laminate, the extruder has to be stopped, the carrier layer being interrupted, so that on restarting of the machine it will be necessary to reintroduce the front end of the web manually through the different processing machines arranged behind one another, which is complicated and time-consuming work, since the web on the one hand is easily damageable and on the other hand is produced at a constant high speed (so-called flying start).

The laminated packing material of the all-plastics type as well as that of plastics/paper is used for the manufacture of packages of different types and sizes which makes necessary the imprinting of various crease-line patterns. During a production period changes of the rollers imprinting the crease-line pattern will thus frequently occur. In the manufacture of paper-based packing laminate this change constitutes no great problem, since either the production can be stopped when the creasing rollers are changed or, by making use of a number of creasing machines arranged in series, the creasing rollers in one creasing machine can be changed whilst another creasing machine is effective and provides the moving web with the crease-line pattern. The exchange of creasing rollers is appreciably more complicated, however, in the manufacture of extruded plastic material, since the extrusion cannot be interrupted during the changing of rollers. It is also not possible to arrange a number of creasing machines in series, since it will then be almost impossible to guide the web on the desired path through all creasing machines when production is started, primarily because of the relatively high speed of the web. The solution with a number of creasing machines arranged in series is also disadvantageous inasmuch as it will be very space-consuming and expensive, especially if, as is usually the case, the material web is to be provided with crease-lines on both sides.

It is an object of the present invention to provide an arrangement for the processing of a moving material web, especially the creasing or punching of an extruded material web, which arrangement permits the exchange of the cylinders processing the material during operation.

It is a further object of the present invention to provide a compact and little expensive arrangement which is well-suited for the processing of a laminated packing material web comprising a layer of foamed plastic material.

It is a further object of the present invention to provide an arrangement which with great accuracy permits a double-sided creasing of the packing material web.

It is a further object of the present invention to provide an arrangement which uses a minimum number of counter-rollers and which is inexpensive and uncomplicated.

It is finally an object of the present invention to provide a creasing arrangement through which the web can be guided in a simple manner at the start of the production.

These and other objects have been achieved in accordance with the invention in that an arrangement for the processing of a moving material web has been given the characteristic that it comprises two or more processing rollers, arranged parallel with the central axle, and counter-rollers co-operating with the same, which are supported so that they can swivel about the central axle so as to be moved to an active position in contact with the processing rollers.

A preferred embodiment of the arrangement in accordance with the invention has been given the further characteristic that the processing rollers are supported so that they can rotate in the frame of the arrangement and are positioned in pairs on diametrically opposite sides of the central axle, a cradle, which is swivelling about the central axle, carrying the counter-rollers which are also positioned on diametrically opposite sides of the central axle.

A further embodiment of the arrangement in accordance with the invention has been given the further characteristic that the counter-rollers are closer to the central axle than the processing rollers.

A further embodiment of the arrangement in accordance with the invention has been given the further characteristic that the cradle when it is swivelled into the active position moves the counter-rollers to a position in which they are in the same plane as the central axle and a pair of processing rollers.

A further embodiment of the arrangement in accordance with the invention has been given the further characteristic that the counter-rollers, supported in the cradle, are at such a distance from one another that in the inactive position of the arrangement the material web can be guided between the rollers.

A further embodiment of the arrangement in accordance with the invention has been given the further characteristic that the processing rollers are arranged with equal division around the central axle.

A further embodiment of the arrangement in accordance with the invention has been given the further characteristic that the processing rollers are supported adjustably so as to be movable towards and away from the central axle.

A further embodiment of the arrangement in accordance with the invention has been given the further characteristic that the counter-rollers are supported adjustably so as to be movable towards and away from the central axle.

A further embodiment of the arrangement in accordance with the invention has been given the further characteristic that the processing rollers are constituted of driven rollers for the creasing or punching of the material web.

A further embodiment of the arrangement in accordance with the invention finally has also been given the characteristic that the counter-rollers are freely rotatable and are made of a flexible material.

The arrangement in accordance with the invention will now be described in more detail with special reference to the enclosed schematically drawn figures, which all show a preferred embodiment of the arrangement in section from the side. The figures on the drawing are greatly simplified and only show the details necessary for an understanding of the invention.

Figure 1:
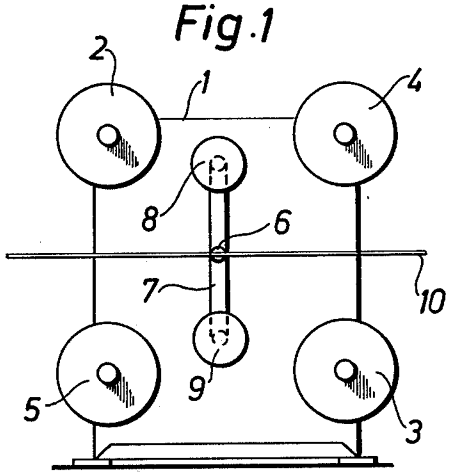
FIG. 1 shows the arrangement in accordance with the invention in inactive position, but with the material web threaded through the arrangement.

The preferred embodiment of the arrangement in accordance with the invention shown comprises a frame 1 wherein four processing or creasing rollers 2–5 are supported rotatably at a substantially equal distance from a geometrically central axle 6. The processing rollers are parallel with one another as well as with the central axle and are arranged with equal division around the same. The rollers are cylindrical and they are provided on their surface with the desired pattern of crease rules. Each roller is driven either individually or synchronously with the diagonally opposite roller by means of a gear mechanism.

The central axle 6 serves as a suspension centre for a swivelling cradle 7 at the outer ends of which two counter-rollers 8, 9 are supported so that they can freely rotate. The counter-rollers are parallel with the central axle and positioned on diametrically opposite sides of the same, which also applies to the processing rollers 2–5, if these are considered in pairs. Since the cradle 7 is supported in the frame 1 by means of short axle journals (not shown), a free space is created between the two counter-rollers 8, 9, whose width substantially coincides with the length of the rollers. Since a corresponding free space exists between the processing rollers and the frame sides respectively, a tunnel-shaped space will be created between the rollers and the sides of the cradle 7 and the frame 1 respectively, when the arrangement is in the position shown in FIG. 1, through which the packing material web 10 can run freely.

Figure 2:
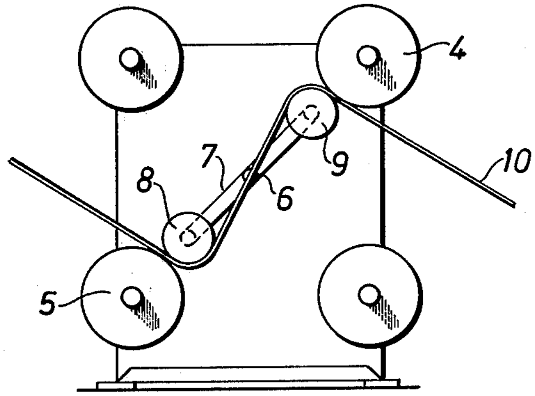
FIG. 2 shows the arrangement in a first of two alternative active positions.

In FIG. 2 the arrangement in accordance with the invention is shown in a first active position. This position is obtained in that the cradle 7, after the material web 10 has been made to pass through the arrangement as shown in FIG. 1, is swivelled counter-clockwise until the two counter-rollers are in the same plane as the central axle 6 and the two processing rollers 4, 5. The packing material web 10 will then run in the interspace between the counter-roller 9 and the processing roller 4 and between the counter-roller 8 and the processing roller 5 respectively. The figure clearly shows that the counter-rollers 8, 9 are nearer to the central axle 6 than the processing rollers, and the distance between the central axle 6 and the counter-rollers 8, 9 and the processing rollers respectively, more particularly, is chosen so that a substantially linear contact surface arises between the rollers when the arrangement is in one of its active positions. The processing rollers 2–5 are supported adjustably in such a manner that they can be moved in parallel in the direction towards or away from the central axle 6, as a result of which rollers of varying diameter may be used and coupled together for synchronous driving by means of a gear mechanism. The points of support of the counter-rollers too are suitably adjustable so that the counter-rollers 8,9 may be shifted in the direction towards or away from the central axle 6 in order to adjust the contact pressure between the counter-rollers and the processing rollers to a suitable value. When the arrangement in accordance with the invention is used as a creasing machine the counter-rollers 8, 9 are usually made of a flexible material, e.g. hard rubber, but in other uses of the arrangement, e.g. for the making of holes in the material web or for the insertion of tearing directions, counter-rollers of another material or of another design may be used.

Figure 3:
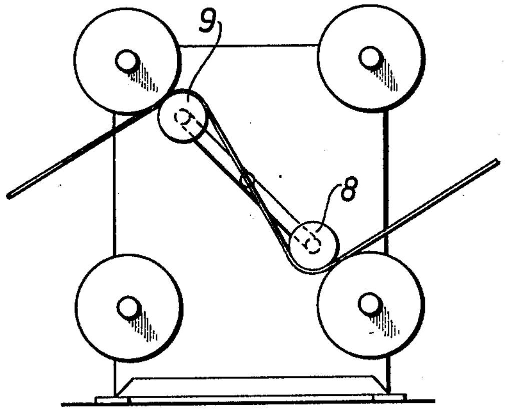
FIG. 3 shows the arrangement in accordance with the invention in a second of the two active positions.

FIG. 3 corresponds to FIG. 2, but shows the arrangement in the other one of its active positions, wherein the counter-rollers 8, 9 are caused to engage with the processing cylinders 2, 3 through rotation of the cradle 7 by 135° clockwise, when the counter-rollers 8, 9 are in the same plane as the processing rollers 2, 3 and the central axle 6.

When the arrangement in accordance with the invention is to be used in its preferred embodiment as an arrangement for the creasing of packing material web comprising an extruded foamed plastic layer, the arrangement is placed together with the other processing machines, e.g. a printing mechanism, punching mechanism, cutting devices and the like, in series after the extrusion device. The arrangement in accordance with the invention is then provided with the desired equipment of creasing rollers 2–5. When the material manufacture is started the newly extruded carrier layer consisting of foamed plastics is first provided with the two homogeneous plastic layers, which are extruded synchronously with the carrier layer web and are laminated to the same with the help of lamination rollers. Thereafter the front end of the web is passed through the free, tunnel-shaped space between processing and the counter rollers in the arrangement in accordance with the invention. These rollers are then in their inactive position shown in FIG. 1, which makes the steering of the front end of the material through the arrangement very simple, even at the high manufacturing speeds which are normally used. When the web end is guided through the arrangement in accordance with the invention it is guided further for subsequent processing, e.g. printing or the like, which however is of no importance for the invention and will therefore not be described in detail.

When production has been set in motion and the front end of the web has been fed in the correct manner through the arrangement in accordance with the invention, the driving of the two processing rollers 4, 5, which are to be used first is started, in that these are coupled together via the said gear mechanism with the printing device for synchronous driving. Subsequently the arrangement in accordance with the invention is brought into its first active position (FIG. 2) in that the cradle 7 is swivelled counterclockwise so that the two counter-rollers 8, 9 first come into contact with the web, and subsequently, on further rotation of the cradle 7, bring the web into contact with the processing rollers 4, 5. The inter-space between the processing rollers and counter-rollers set in advance can then be fine-adjusted further by movement of the counter-rollers 8, 9 in the direction towards or away from the processing rollers until a correct contact pressure has been obtained. This contact pressure is then obtained automatically whenever the cradle 7 is swivelled again from the inactive to the active position, since the swivelling movement of the cradle does not affect the distance of the counter-rollers 8, 9 from the central axle 6.

During the operation in this first, active position the frame 1 can be provided with creasing rollers 2, 3 bearing the desired crease-line pattern which the packing material web 10 subsequently is to be provided with. When the desired quantity of packing material web with the aforementioned crease-line pattern has been produced, the change-over to a new crease-line pattern is prepared in that the two creasing rollers 2, 3 are set in motion and are driven at synchronous speed. Then the cradle is swivelled clockwise from the first active position shown in FIG. 2 and via the inactive position (FIG. 1) to the other active position shown in FIG. 3 wherein the packing material web moves in contact with the creasing rollers 2, 3. The manoeuvre can take place without interruption of the web feed and with a minimum of waste material. The earlier used creasing rollers 4, 5 are now unutilized and, after their drive has been stopped, they can be changed for new rollers with any desired new crease-line pattern.

The arrangement in accordance with the invention is symmetrical, inasmuch as the material web can be driven in both directions through the arrangement, whilst it has to be ensured, of course, that the driving of the processing rollers takes place in the correct direction. As can be seen from the drawing a processing of both sides of the material web is obtained in each of the two active positions, that is to say the one active processing roller processes one side of the material web and the other active processing roller processes the opposite side of the material web. If desired a processing of only one side may take place, either in that the one processing roller is made completely plain and cylindrical or in that the one processing roller is withdrawn or adjusted to a position at a greater distance from the central axle 6 so that the material web is not pressed between the processing roller and counter-roller.

By placing the processing rollers around a rotatable arrangement of counter-rollers, the number of counter-rollers in relation to processing rollers can be reduced, since the pair of counter-rollers shown can serve at the same time four or more processing rollers. This means that the arrangement can be made simple and at the same time reliable and relatively inexpensive.

Finally the arrangement in accordance with the invention has the advantage that it operates with very great accuracy, since the distance between counter-roller and processing roller, which is very important for a good result, can be kept constant and unchanged after the initial setting, irrespectively of the swivelling of the cradle 7 into and from the active position a number of times, which will be the case if the material web with a certain crease-line pattern is to be manufactured with a brief interruption for a different pattern.

We claim:

1. An arrangement for the processing of a moving material web comprising:

(a) a supporting frame having a central axle;

(b) a cradle swivelly mounted on said central axle;

(c) counter-rollers rotatably mounted on said cradle; and (d) at least two processing rollers arranged parallel with the central axle, said arrangement further being constructed and arranged such that the cradle can be swivelled between an inactive position wherein the moving material web is out of contact with the counter-rollers and the processing rollers and an active position wherein the moving material web is contacted with the counter-rollers and at least some of the processing rollers.

2. The arrangement of claim 1 wherein the processing rollers are positioned in pairs on diametrically opposite sides of the central axle.

3. The arrangement of claim 2 wherein the counter-rollers are located closer to the central axle than the processing rollers.

4. The arrangement of claim 3 wherein the counter-rollers and the contacted processing rollers are in the same plane as the central axle when the cradle is swivelled to the active position.

5. The arrangement of claim 4 wherein the counter-rollers are located on the cradle such that in the inactive position, the material web can be guided between the counter-rollers.

6. The arrangement of claim 4 wherein the processing rollers are arranged equidistant from the central axle.

7. The arrangement of claim 4 wherein the processing rollers are adjustably supported so as to be movable towards and away from the central axle.

8. The arrangement of claim 4 wherein the counter-rollers are adjustably supported so as to be movable towards and away from the central axle.

9. The arrangement of claim 4 wherein the processing rollers are comprised of driven rollers for the creasing or punching of the material web.

10. The arrangement of claim 4 wherein the counter-rollers are freely rotatable and are constructed from a flexible material.

* * * * *